(12) United States Patent
Ma et al.

(10) Patent No.: US 9,031,591 B2
(45) Date of Patent: May 12, 2015

(54) SYSTEM AND METHOD FOR SELF-OPTIMIZED INTER-CELL INTERFERENCE COORDINATION

(75) Inventors: Jianglei Ma, Ottawa (CA); Mohammadhadi Baligh, Ottawa (CA)

(73) Assignee: Futurewei Technologies, Inc., Plano, TX (US)

( * ) Notice: Subject to any disclaimer, the term of this patent is extended or adjusted under 35 U.S.C. 154(b) by 320 days.

(21) Appl. No.: 13/297,991

(22) Filed: Nov. 16, 2011

(65) Prior Publication Data

US 2012/0122503 A1   May 17, 2012

Related U.S. Application Data

(60) Provisional application No. 61/414,719, filed on Nov. 17, 2010.

(51) Int. Cl.
| | | |
|---|---|---|
| H04B 15/00 | (2006.01) | |
| H04B 7/00 | (2006.01) | |
| H04W 72/00 | (2009.01) | |
| H04W 16/10 | (2009.01) | |

(52) U.S. Cl.
CPC ..................................... *H04W 16/10* (2013.01)

(58) Field of Classification Search
CPC ................................................ H04W 72/0433
USPC ........................... 455/513, 67.13, 63.1, 226.1
See application file for complete search history.

(56) References Cited

U.S. PATENT DOCUMENTS

| | | | | |
|---|---|---|---|---|
| 8,165,098 | B2 * | 4/2012 | Teo et al. ...................... | 370/335 |
| 8,270,976 | B2 * | 9/2012 | Simonsson et al. ........... | 455/436 |
| 8,731,567 | B2 * | 5/2014 | Zhang et al. .................. | 455/447 |
| 2004/0001429 | A1 | 1/2004 | Ma et al. | |
| 2006/0286995 | A1 * | 12/2006 | Onggosanusi et al. ....... | 455/522 |
| 2007/0105508 | A1 | 5/2007 | Tong et al. | |
| 2007/0263735 | A1 | 11/2007 | Tong et al. | |
| 2007/0274252 | A1 | 11/2007 | Zhang et al. | |
| 2007/0275729 | A1 | 11/2007 | Kashima et al. | |
| 2008/0090574 | A1 | 4/2008 | Soong et al. | |
| 2008/0151743 | A1 | 6/2008 | Tong et al. | |
| 2008/0253279 | A1 | 10/2008 | Ma et al. | |
| 2009/0060081 | A1 | 3/2009 | Zhang et al. | |
| 2009/0086648 | A1 | 4/2009 | Xu et al. | |

(Continued)

FOREIGN PATENT DOCUMENTS

| | | |
|---|---|---|
| CN | 101742521 A | 6/2010 |
| CN | 101795471 A | 8/2010 |

OTHER PUBLICATIONS

Fodor, G., et al., "Intercell Interference Coordination in OFDMA Networks and in the 3GPP Long Term Evolution System," Journal of Communications, vol. 4, No. 7, Aug. 2009, pp. 445-453.

(Continued)

*Primary Examiner* — Tilahun B Gesesse

(74) *Attorney, Agent, or Firm* — Slater & Matsil, L.L.P.

(57) ABSTRACT

An embodiment method for operating a controller of a communications system includes determining inter-cell interference coordination (ICIC) information for the communications system, automatically adjusting, by the controller without end-user input, ICIC parameters according to the ICIC information to improve an overall performance level of the communications system, and transmitting the ICIC operation parameters to network entities in the communications system.

28 Claims, 13 Drawing Sheets

(56) References Cited

U.S. PATENT DOCUMENTS

| | | | |
|---|---|---|---|
| 2009/0129334 A1 | 5/2009 | Ma et al. | |
| 2009/0201867 A1* | 8/2009 | Teo et al. | 370/329 |
| 2009/0245197 A1 | 10/2009 | Ma et al. | |
| 2009/0285163 A1 | 11/2009 | Zhang et al. | |
| 2009/0291692 A1 | 11/2009 | Kazmi et al. | |
| 2010/0124181 A1 | 5/2010 | Hosein | |
| 2010/0203882 A1* | 8/2010 | Frenger et al. | 455/423 |
| 2012/0028664 A1* | 2/2012 | Zhang et al. | 455/501 |

OTHER PUBLICATIONS

Katzela, I., et al., "Channel Assignment Schemes for Cellular Mobile Telecommunication Systems: A Comprehensive Survey," IEEE Personal Communications, Jun. 1996, pp. 10-31.

Stolyar, A. L., et al., "Self-organizing Dynamic Fractional Frequency Reuse Through Distributed Inter-cell Coordination: The Case of Best-Effort Traffic," ftp://204.178.31.32/who/stoylar/be_dffr.pdf, May 29, 2008, 27 pages.

International Search Report of Patent Cooperation Treaty, International Application No. PCT/CN2011/082367, Applicant Huawei Technologies Co., Ltd., et al., date of mailing Dec. 29, 2011, 3 pages.

Nortel, "Adaptive Fractional Frequency Reuse," 3GPP TSG-Ran Working Group 1, R1-062150, Agenda Item: 8.7.2, Aug. 28-Sep. 1, 2006, 10 pages.

Ericsson, "Downlink and uplink inter-cell interference co-ordination/avoidance-impact on the specification," TSG-RAN WG1 meeting #44, R1-060586, Agenda Item: 13.2.3.6, Feb. 13-17, 2006, 5 pages.

"Extended European Search Report," Application No. 11842164.3, Applicant: Huawei Technologies Co., Ltd., Oct. 28, 2013, 8 pages.

Samsung, "Flexible Fractional Frequency Reuse Approach," 3GPP TSG RAN WG1 Meeting #43, R1-051341, Agenda Item: 8.2, Nov. 7-11, 2005, 7 pages.

\* cited by examiner

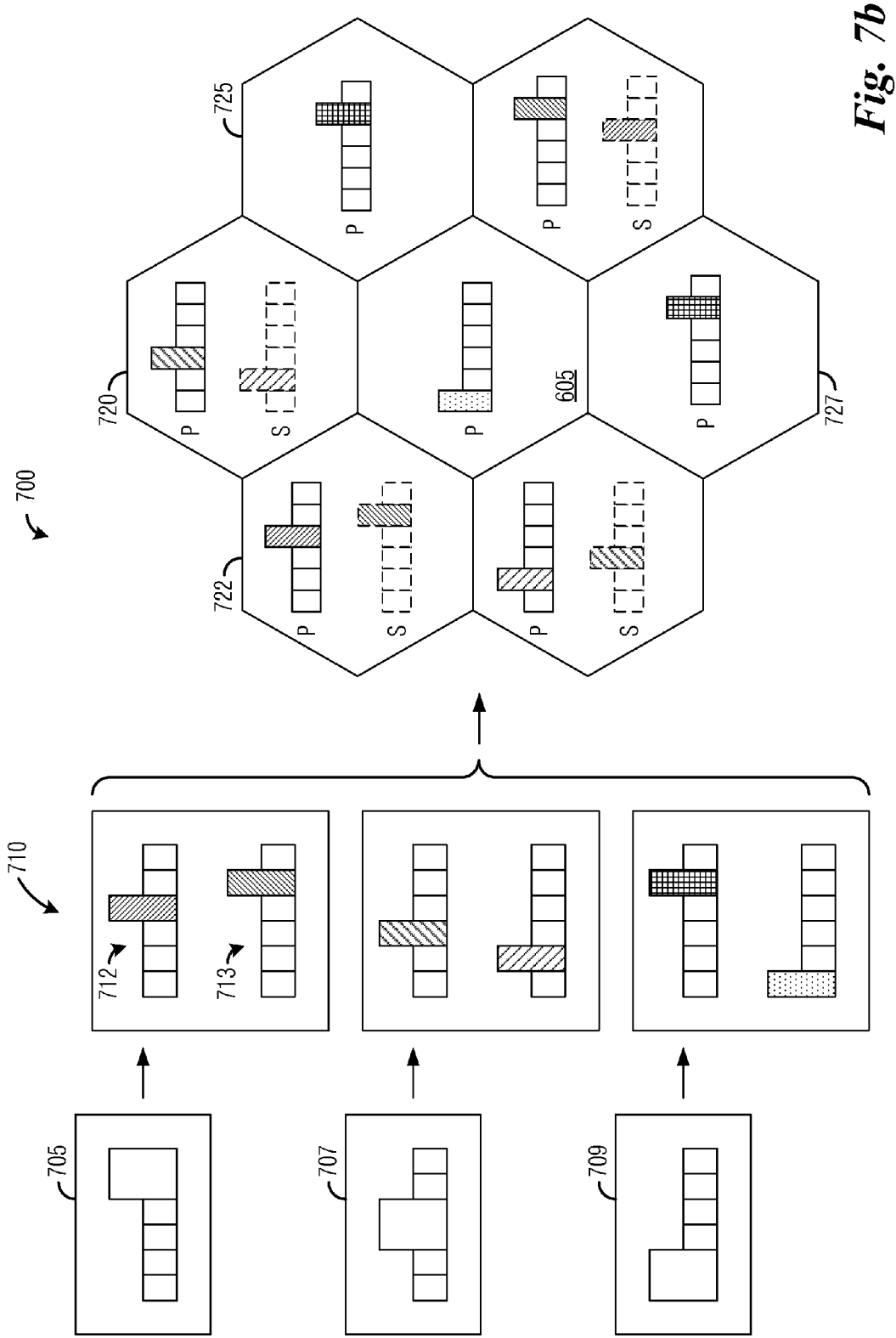

SYSTEM AND METHOD FOR SELF-OPTIMIZED INTER-CELL INTERFERENCE COORDINATION

This application claims the benefit of U.S. Provisional Application No. 61/414,719, filed on Nov. 17, 2010, entitled "System and Method for Self-Optimized ICIC," which application is hereby incorporated herein by reference.

TECHNICAL FIELD

The present invention relates generally to digital communications, and more particularly to a system and method for self-optimized inter-cell interference coordination (ICIC).

BACKGROUND

Inter-cell interference (ICI) may be considered to be interference at a cell due to transmissions originating in another cell. Usually, ICI occurs between adjacent cells of a communications system. As an example, relatively high-powered transmissions to and from a cell edge user (CEU) operating in a first cell may cause more interference to adjacent cells utilizing the same operating frequency than relatively lower-powered transmissions to and from a cell center user (CCU) operating in the first cell to adjacent cells utilizing the same operating frequency due to correspondingly higher power levels of the transmissions to and from the CEU.

FIG. 1 illustrates a prior art communications system 100. Communications system 100 includes a first evolved NodeB (eNB) 105 and a second eNB 115. An eNB (also commonly referred to as a base station, communications controller, NodeB, and so forth) may be in communications with User Equipment (UE) operating within its coverage area. For example, eNB 105 may have a coverage area illustrated in FIG. 1 as hexagon 110, while eNB 115 may have a coverage area illustrated as hexagon 120. Operating within hexagon 110 may be a first UE 125 and a second UE 130. A UE may also be commonly referred to as a mobile station, user, terminal, subscriber, and so on).

A coverage area of an eNB (or more generally, a cell of an eNB) may be categorized based upon a distance (in an electrical distance sense wherein a more distant UE may have receive greater signal strength than a closer UE due to factors such as shadowing, line of sight, height, and so on) of a UE to the eNB. For example, coverage area of eNB 105 (i.e., hexagon 110) may be categorized into two regions, with a first region being a cell center region (shown as circle 135) and a cell edge region (portions of hexagon 110 outside of circle 135, shown as region 140). Normally, with downlink fractional frequency reuse inter-cell interference coordination (ICIC), UEs operating within a cell center region, such as UE 125, may receive transmissions made at a lower power level than UEs operating outside of a cell center region, such as UE 130, due to their closer proximity to the eNB serving the coverage area.

Furthermore, since transmissions made by UEs (i.e., uplink transmissions) operating with a cell edge region, such as UE 130, are usually made at higher power levels and the UEs are also located closer to neighboring (e.g., adjacent) eNBs, the transmissions may cause more interference to the neighboring eNBs. For downlink transmissions, UEs in a first eNB (e.g., a serving eNB) that are located closer to a neighboring eNB (i.e., an adjacent eNB) may experience high interference from transmissions of the neighboring eNB than UEs operating in a cell center region of the first eNB.

One form of ICIC is fractional frequency reuse (FFR) ICIC. In FFR ICIC, available time and/or frequency resources may be divided into multiple parts, also commonly referred to as a FFR pattern or frequency reuse pattern, which may be allocated to different transmitters. The transmitters may then transmit only during times and/or in frequencies associated with their allocated time and/or frequency part(s), or transmit with different power densities in different time and/or frequency parts according to a predefined power density mask. Assignment of the time and/or frequency parts may be made so that adjacent and/or close transmitters cause little or no interference to one another and/or receivers. As an example, adjacent transmitters may be assigned different time and/or frequency part(s) so that their transmissions do not overlap either in time and/or frequency.

The FFR ICIC technique used may be referred by the number of parts that the available is divided into. As an example, FFR with reuse-2 would divide the available resources into two parts that may be assigned to transmitters in an attempt to reduce interference. Similarly, FFR with reuse-3 would divide the available resources into three parts, while FFR with reuse-1 would not divide the available resources at all and may be indicative of non-FFR operation.

It is widely considered that ICI management will be a key technology for enhancing the performance of Third Generation Partnership Project (3GPP) Long Term Evolution (LTE) compliant communications systems, for example, and overall UE experience. Therefore, there is a need for ICI reducing techniques, of which, ICIC is one form. ICIC is a simple and efficient ICI management scheme. Generally, ICIC attempts to reduce and/or control ICI through the use of radio resource management (RRM) methods. Typically, ICIC takes into account information from multiple cells, such as neighboring cells, to control inter-cell interference. A usual ICIC strategy may be to determine resources available at a cell, which may then be scheduled (i.e., allocated) to users. ICIC in Orthogonal Frequency Division Multiple Access (OFDMA) communications systems, such as 3GPP LTE communications systems, have received considerable study.

A persistent challenge to communications systems is the change in operating conditions over time. For example, cell loading may change over time, UE distribution geometries may change over time, number of scheduled UEs may change over time, and so forth. As the operating conditions change, an ICIC mode that yielded good performance under a first set of operating conditions may no longer provide good performance under a second, different set of operating conditions. Additionally, operating conditions may vary on a geographical basis, and an ICIC mode that works well in one area may not work as well in another. Therefore, there is a need for a system and method that allows for ICIC mode self-optimization at a variety of different levels and/or granularities to meet changing operating conditions in the communications system.

SUMMARY OF THE INVENTION

Technical advantages are generally achieved by embodiments of the present invention which provide a system and method for self-optimized ICIC.

In accordance with an example embodiment of the present invention, a method for operating a controller of a communications system is provided. The method includes determining inter-cell interference coordination (ICIC) information for the communications system, automatically adjusting, by the controller without end-user input, ICIC parameters according to the ICIC information to improve an overall performance level of the communications system, and transmitting the ICIC operation parameters to network entities in the communications system.

In accordance with another example embodiment of the present invention, a method for operating a controller is provided. The method includes determining inter-cell interference coordination (ICIC) information for a communications system, automatically adjusting, by the controller without end-user input, ICIC parameters with a fast adaptation rate according to the ICIC information to improve an overall performance of the communications system, and transmitting the ICIC parameters to network entities in the communications system.

In accordance with another example embodiment of the present invention, a controller is provided. The controller includes a processor, and a transmitter coupled to the processor. The processor determines inter-cell interference coordination (ICIC) information for a communications system, and automatically adjusts ICIC parameters, without end-user input, according to the ICIC information to improve an overall performance level of the communications system. The transmitter transmits the ICIC parameters to network entities in the communications system.

In accordance with another example embodiment of the present invention, a controller is provided. The controller includes a processor, and a transmitter coupled to the processor. The processor determines inter-cell interference coordination (ICIC) information for a communications system, and automatically adjusts ICIC parameters, without end-user input, with a fast adaptation rate according to the ICIC information to improve an overall performance of the communications system. The transmitter transmits the ICIC parameters to network entities in the communications system.

One advantage of an embodiment is that the example embodiments presented herein provide ICIC self-optimization for a communications system to meet changing operating conditions without requiring operator intervention, which may help to prevent mistakes, as well as keep costs down.

A further advantage of an embodiment is that since the ICIC self-optimization is performed automatically, changes to the ICIC configuration may occur quickly and automatically. Hence, end-users will not notice changes, other than improved performance.

A further advantage of an embodiment is that the ICIC self-optimization occurs at different levels, thereby providing ICIC self-optimization at different degrees of granularity and ICIC self-optimization rates.

BRIEF DESCRIPTION OF THE DRAWINGS

For a more complete understanding of the present invention, and the advantages thereof, reference is now made to the following descriptions taken in conjunction with the accompanying drawing, in which:

FIG. 7b illustrates an example diagram of a hierarchical FFR pattern configuration and use thereof according to example embodiments described herein;

DETAILED DESCRIPTION OF ILLUSTRATIVE EMBODIMENTS

The operating of the current example embodiments and the structure thereof are discussed in detail below. It should be appreciated, however, that the present invention provides many applicable inventive concepts that can be embodied in a wide variety of specific contexts. The specific embodiments discussed are merely illustrative of specific structures of the invention and ways to operate the invention, and do not limit the scope of the invention.

One embodiment of the invention relates to inter-cell interference coordination (ICIC) self-optimization, which automatically selects and/or adjusts ICIC modes without end-user input based on operating conditions for a communications system or a portion of a communications system. For example, at a global level or above an individual level, ICIC self-optimization includes ICIC operating mode self-adaptation, ICIC configuration self-adaptation, ICIC performance self-optimization, and/or ICIC performance self-management. While at a local level, ICIC self-optimization includes ICIC performance self-optimization.

The present invention will be described with respect to example embodiments in a specific context, namely a wireless communications system that supports ICIC. The invention may be applied to a variety of standards compliant communications systems, such as Third Generation Partnership Project (3GPP) Long Term Evolution (LTE), 3GPP LTE-Advanced, WiMAX, IEEE 802.16, and so forth, as well as non-standards compliant communications systems.

Figure 1:
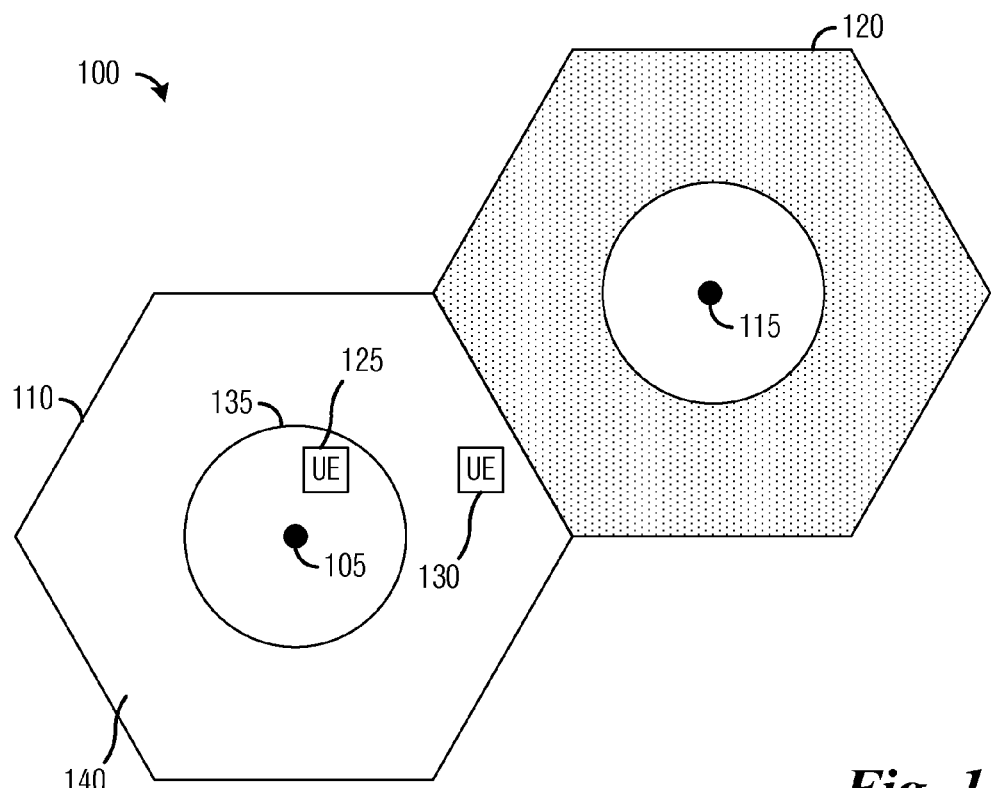
FIG. 1 illustrates an example prior art communications system.
Figure 2:
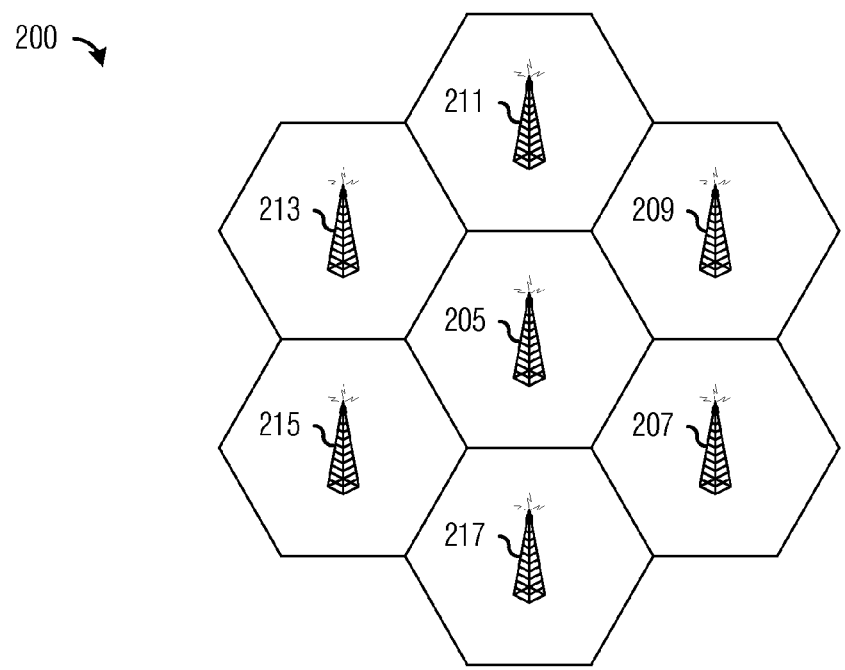
FIG. 2 illustrates an example communications system according to example embodiments described herein.

FIG. 2 illustrates a communications system 200. Communications system 200 includes a plurality of cells, such as cells 205 through 217. A first-order neighboring cell may be defined as cells that are directly adjacent to one another. As shown in FIG. 2, cells 207 through 217 are first-order neighboring cells of cell 205. A second-order neighboring cell may be defined as cells that are not directly adjacent to one another but are neighboring cells to one common intermediate cell. As shown in FIG. 2, cells 209 and 215 are second-order neighboring cells (through common intermediate cell 205). Similar relationships exist for higher-order neighboring cells.

Generally, a coverage area of an eNB may be sectorized into a number of sectors in order to increase utilization, decrease interference, and so forth. Each sector may be referred to as a cell. Therefore, without loss of generality, when referring to coverage areas, a cell may be descriptive of a portion of an eNB or the coverage area of the eNB in its entirety.

Figure 3:
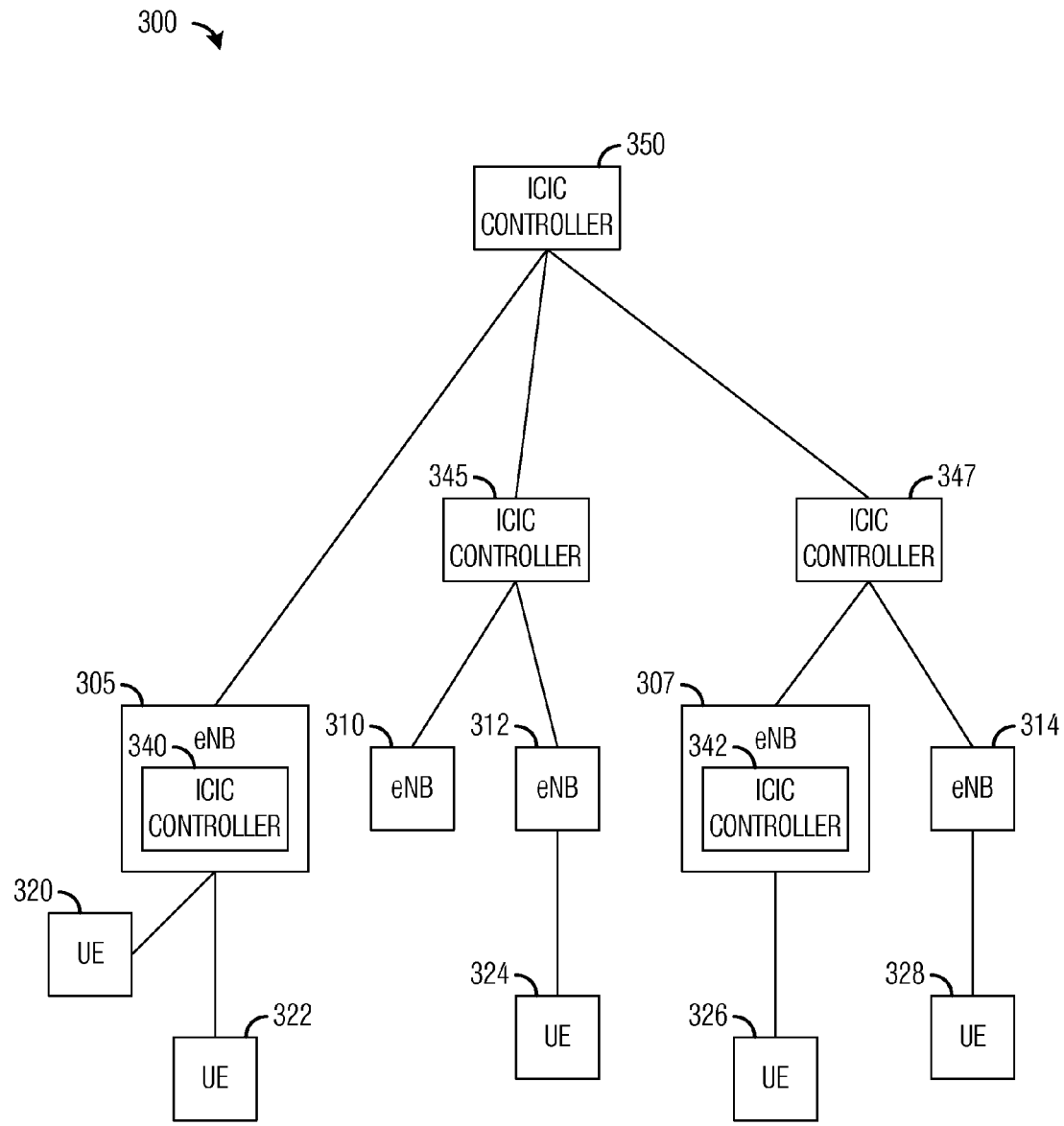
FIG. 3 illustrates an example communications system with ICIC controllers involved in ICIC self-optimization for eNBs in the communications system according to example embodiments described herein.

FIG. 3 illustrates a communications system 300 with ICIC controllers involved in ICIC self-optimization for eNBs in communications system 300. Communications system 300 includes a plurality of eNBs, such as eNB 305, eNB 307, eNB 310, eNB 312, and eNB 314, and a plurality of UEs, such as UE 320, UE 322, UE 324, UE 326, and UE 328. The UEs communicate through their respective controlling eNBs. As an example, UE 320 and UE 322 communicate through eNB 305, while UE 324 communicates through eNB 312.

ICIC controllers may perform ICIC self-optimization for eNBs in communications system 300. There may be several different types of ICIC controllers. At a first level, there may be an individualized ICIC controller located in an eNB that may perform ICIC self-optimization for the eNB. As an example, ICIC controller 340 is an individualized ICIC controller for eNB 305. Similarly, ICIC controller 342 is an individualized ICIC controller for eNB 307. ICIC controller 340 and ICIC controller 342 may perform ICIC self-optimization for the eNBs connected to them in a distributed ICIC self-optimization configuration. Although shown to be located in an eNB, an individualized ICIC controller may be co-located or coupled to its respective eNB.

Not all eNBs may have an individualized ICIC controller. As shown in FIG. 3, eNB 310, eNB 312, and eNB 314 do not have individualized ICIC controllers. According to an example embodiment, an eNB may have an individualized ICIC controller if it is placed in a location with a difficult interference scenario, which may result in a need for rapid and frequent interaction with an ICIC controller.

At a second level, there may be localized ICIC controllers coupled to subsets of eNBs. The localized ICIC controller may perform ICIC self-optimization for the eNBs in the subset of eNBs to which it is coupled. As an example, ICIC controller 345 is a localized ICIC controller for eNB 310 and eNB 312, while ICIC controller 347 is a localized ICIC controller for eNB 307 and eNB 314. ICIC controller 345 and ICIC controller 347 may perform ICIC self-optimization for the eNBs coupled to them in a partially distributed ICIC self-optimization configuration. Additionally, a localized ICIC controller may be coupled to other localized ICIC controllers as well as eNBs.

Although some eNBs, such as eNB 310 and eNB 312, are shown without individualized ICIC controllers, these eNBs and other similarly configured eNBs may still operate in an ICIC operating mode and may be capable of performing a subset of possible ICIC operations.

At a third level, there may be a global ICIC controller coupled to eNBs and ICIC controllers. The global ICIC controller may perform ICIC self-optimization for the eNBs in the communications system. As an example, ICIC controller 350 is a global ICIC controller for the eNBs in communications system 300. ICIC controller 350 may perform ICIC self-maintenance and/or ICIC self-optimization for the eNBs in communications system 300 in a centralized ICIC self-optimization configuration or a partially distributed ICIC self-optimization configuration.

It is noted that FIG. 3 illustrates a limited number of eNBs, UEs, and ICIC controllers. It is well understood that a communications system may include any number of eNBs, UEs, and ICIC controllers. However, a limited number of eNBs, UEs, and ICIC controllers are illustrated to maintain simplicity.

Figure 4:
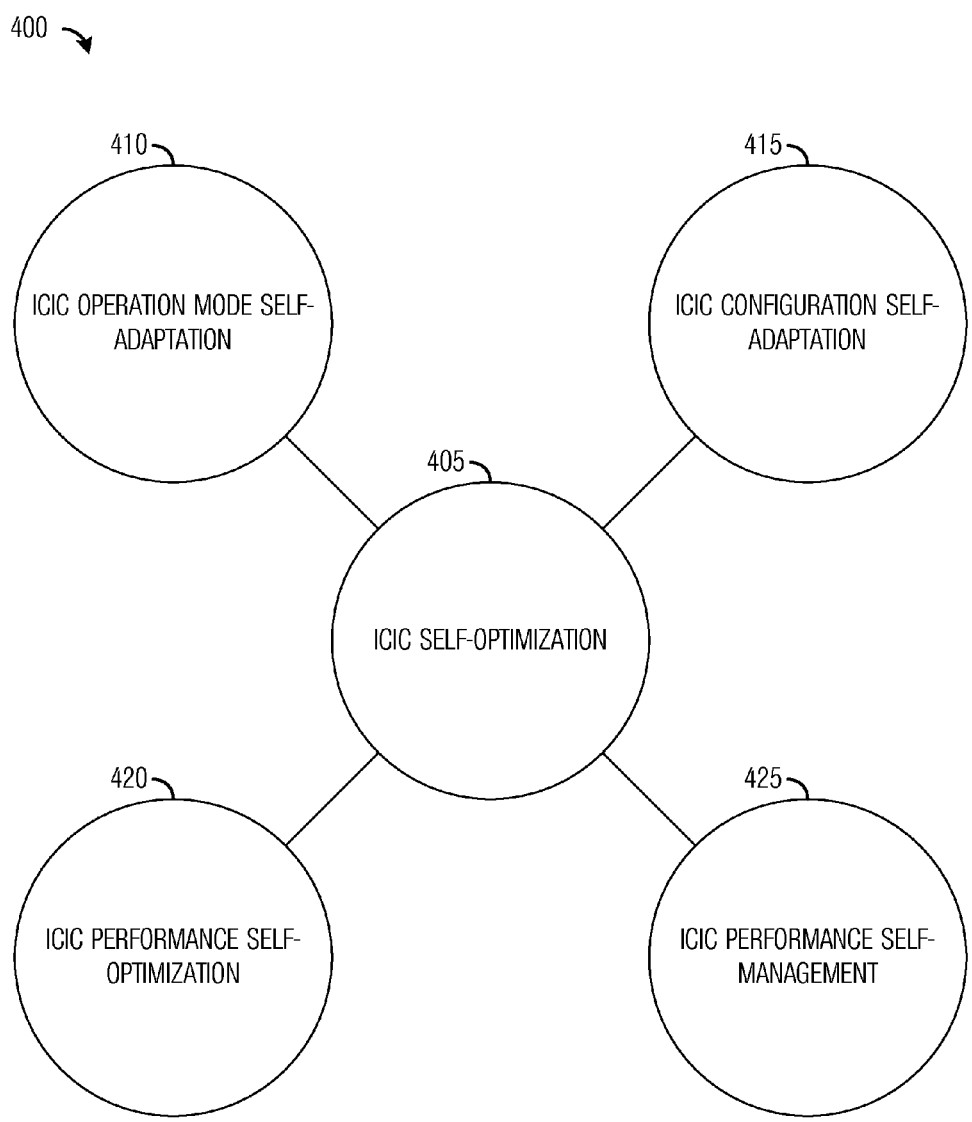
FIG. 4 illustrates an example diagram according to example embodiments described herein.

FIG. 4 illustrates a diagram 400. Diagram 400 highlights operations considered to be ICIC self-optimization. At a high level, ICIC self-optimization 405 comprises a number of individual operations. The individual operations may or may not interact with one another. Furthermore, the individual operations may or may not share information with one another. However, the operations proceed without end-user input, which means that end-user input is generally not needed once initiated.

ICIC self-optimization 405 typically executes on an ICIC controller in a centralized manner, which means that a single ICIC controller performs ICIC self-optimization 405 for lower level ICIC controllers, communications controllers, or a combination thereof, under its control. As an example, a global ICIC controller (such as ICIC controller 350) of a communications system performs ICIC self-optimization 405 in a centralized manner for the ICIC controllers and/or communications controllers in its communications system. Similarly, a localized ICIC controller (such as ICIC controller 345 and ICIC controller 347) of a portion of a communications system performs ICIC self-optimization 405 in a centralized manner for its respective portion of the communications system. While an individualized ICIC controller (such as ICIC controller 340 and ICIC controller 342) of a single communications controller performs ICIC self-optimization 405 in for its respective communications controller.

ICIC self-optimization 405 includes ICIC operation mode self-adaptation 410 that may be used by an ICIC controller to select an ICIC operating mode for the communications system or a portion of the communications system. Generally, ICIC operation mode self-adaptation 410 may be performed at a global or local level. As an example, if ICIC operation mode self-adaptation 410 is executing in a global ICIC controller, then the ICIC operating mode of the entire communications system or a portion thereof may be selected. While if ICIC operation mode self-adaptation 410 is executing in a localized ICIC controller, then the ICIC operating mode of eNBs coupled to the localized ICIC controller or a portion thereof may be selected.

Furthermore, ICIC operating mode may be changed, adjusted, tweaked, or otherwise adapted based on network operating information (or simply operating information), such as long term network operating information, and so on, as well as network performance information (or simply performance information), such as key performance indicator (KPI), and so on. In general, the operation information and the performance information may be referred to as ICIC information. As an example, ICIC operating mode, update rates, transmit power levels, FFR reuse pattern, and so forth, may be adapted based on the ICIC information. A detailed discussion of ICIC operation mode self-adaptation 410 is provided below.

ICIC self-optimization 405 also includes ICIC configuration self-adaptation 415 that may be used by an ICIC controller to configure a configuration of a selected ICIC operating mode (as selected by ICIC operation mode self-adaptation 410). Generally, ICIC configuration self-adaptation 415 may be performed at a global or local level. As an example, ICIC configuration self-adaptation 415 executing in an ICIC controller (e.g., a global ICIC controller or a localized ICIC controller) may adapt FFR mode configuration to meet changes in operation information, such as interference, network topology, UE distribution, and so forth. A detailed discussion of ICIC configuration self-adaptation 415 is provided below.

ICIC self-optimization 405 further includes ICIC performance self-optimization 420 may be used by an ICIC controller to configure a configuration of a communications system or a portion thereof when the communications system (or the portion) is operating in an ICIC operating mode. Generally, ICIC performance self-optimization 420 may be performed at a global, local, or individual level. As an example, ICIC performance self-optimization 420 executing in an ICIC controller (e.g., a global ICIC controller, a localized ICIC controller, or an individualized ICIC controller) may perform optimization on an FFR reused pattern, two-level ICIC (e.g., fast and/or slow dynamic ICIC), and so on. A detailed discussion of ICIC performance self-optimization 420 is provided below.

ICIC self-optimization 405 additionally includes ICIC performance self-management 425 that may be used by an ICIC controller to monitor performance of the communications system or a portion thereof. ICIC performance self-management 425 may make use of performance information (e.g., KPI) as well as operating information to control and/or adjust ICIC operation. A detailed discussion of ICIC performance self-management 425 is provided below.

Figure 5:
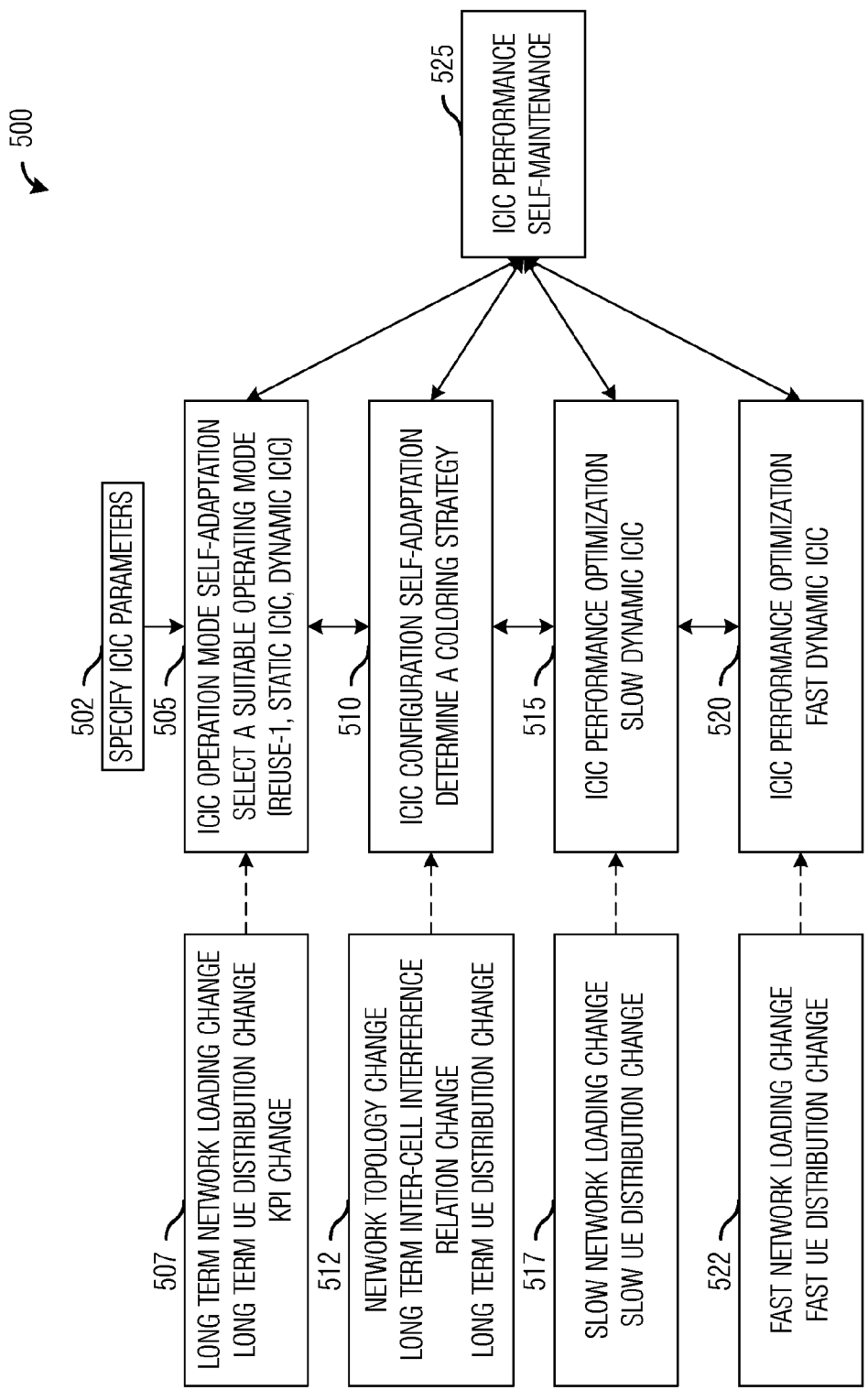
FIG. 5 illustrates an example transition diagram of operations in ICIC self-optimization according to example embodiments described herein.

FIG. 5 illustrates a transition diagram of operations 500 in ICIC self-optimization. Operations 500 may be indicative of operations occurring in an ICIC controller or a combination of ICIC controllers (e.g., a global ICIC controller, a local ICIC controller, or an individualized ICIC controller) as ICIC self-optimization is performed. The ICIC self-optimization may be performed for a communications system in its entirety or a portion of the communications system. The ICIC self-optimization proceeds without end-user input. The ICIC self-optimization may be performed based on ICIC information, such as performance information (KPI, and so forth) and operation information (such as network operation information, and so on). The ICIC information may be long term information, short term information, or a combination thereof.

ICIC self-optimization may begin with a determination of ICIC parameters for the communications system or a portion of the communications system (block 502). The ICIC parameters may be based on ICIC information, such as performance information of the communications system, operational information of the communications system, historical information of the communications system, loading of the communications system, distribution of UE in the communications system, loading of the UE in the communications system, and so on. Although referred to as ICIC parameters, certain configurations of the ICIC parameters may result in the communications system or a portion of the communications system operating in a non-ICIC or a non-ICIC like mode. Alternatively, the ICIC parameters may be a default starting set of parameters specified for the communications system.

ICIC self-optimization may continue with ICIC operation mode self-adaptation 505. According to an example embodiment, an ICIC controller performing ICIC operation mode self-adaptation 505 may select an operating mode and set the ICIC parameters, e.g., ICIC operating mode parameters, according to the selected operating mode. As an example, a global ICIC controller may select operating modes, such as reuse-1 (non-ICIC), static ICIC, or dynamic ICIC for the communications system or a portion of the communications system. The global ICIC controller may make use of ICIC information, which comprises performance information and/or operation information, about the communications system. As an example, performance information (typically long term information) may include KPI change, while operation information may include long term network load change, long term UE distribution change, and so on (block 507), to help it select the operating mode. The ICIC controller may transmit the ICIC parameters to eNBs, as well as other ICIC controllers or network entities in the communications system.

ICIC self-optimization may also include ICIC configuration self-adaptation 510. According to an example embodiment, an ICIC controller performing ICIC configuration self-adaptation 510 may determine a coloring strategy to assign frequency and/or time parts to eNBs and/or cells in the communications system and then set the ICIC parameters, e.g., ICIC configuration parameters, accordingly. As an example, a global ICIC controller may assign frequency and/or time parts to eNBs in a communications system or in a portion of the communications system based on ICIC information, which comprises operation information, about the communications system. As an example, operation information (typically long term information), includes information such as network topology change, long term inter-cell interference relation change, long term UE distribution change, and so forth (block 512). The ICIC controller may transmit the ICIC parameters to eNBs, as well as other ICIC controllers or network entities in the communications system.

ICIC self-optimization may also include ICIC performance optimization for slow dynamic ICIC 515. According to an example embodiment, an ICIC controller performing ICIC performance optimization for slow dynamic ICIC 515 may select ICIC patterns and other relatively large scale adjustments to a configuration of the ICIC operating mode and set the ICIC parameters, e.g., ICIC performance parameters, accordingly. As an example, a global ICIC controller may make changes to ICIC patterns, transmit power, transmit bandwidth, and so forth, based on ICIC information, which comprises operation information, about the communications system. As an example, operation information (typically slowly changing information), includes information such as slow network loading change information, slow UE distribution change information, or so on (block 517). The ICIC controller may transmit the ICIC parameters to eNBs, as well as other ICIC controllers or network entities in the communications system.

ICIC self-optimization may also include ICIC performance optimization for fast dynamic ICIC 520. According to an example embodiment, an ICIC controller performing ICIC performance optimization for fast dynamic ICIC may make adjustments to transmit power, transmit bandwidth, and so forth, to a configuration of the ICIC operating mode and set the ICIC parameters, e.g., ICIC performance parameters, accordingly. As an example, a local ICIC controller or an individualized ICIC controller may make changes to transmit power, transmit bandwidth, and so on, based on ICIC information, which comprises operation information, about the communications system. As an example, operation information (typically fast changing information), includes such as fast network loading change information, fast UE distribution change information, and so on (block 522). ICIC performance optimization for fast dynamic ICIC 520 may or may not require a fast information interconnection, such as an X2 signaling interface, between the ICIC controllers. The ICIC controller may transmit the ICIC parameters to eNBs, as well as other ICIC controllers or network entities in the communications system.

ICIC self-optimization may also include ICIC performance self-maintenance 525. According to an example embodiment, ICIC performance self-maintenance 525 may monitor performance information, such as KPI, and potentially information from ICIC operation mode self-adaptation 505, ICIC configuration self-adaptation 510, ICIC performance optimization for slow dynamic ICIC 515, and ICIC performance optimization for fast dynamic ICIC 520, to control and adjust ICIC operation and set the ICIC parameters accordingly. As an example, an ICIC controller performing ICIC performance self-maintenance 525 may enable or disable ICIC operation, select an ICIC mode, determine a dynamic ICIC rate, trigger an ICIC configuration update, and so on. ICIC performance self-maintenance 525 may be considered as a controlling operation for the other operations in ICIC self-optimization, triggering the execution of the other operations based on the ICIC information. The ICIC controller may transmit the ICIC parameters to eNBs, as well as other ICIC controllers or network entities in the communications system.

Figure 6A:
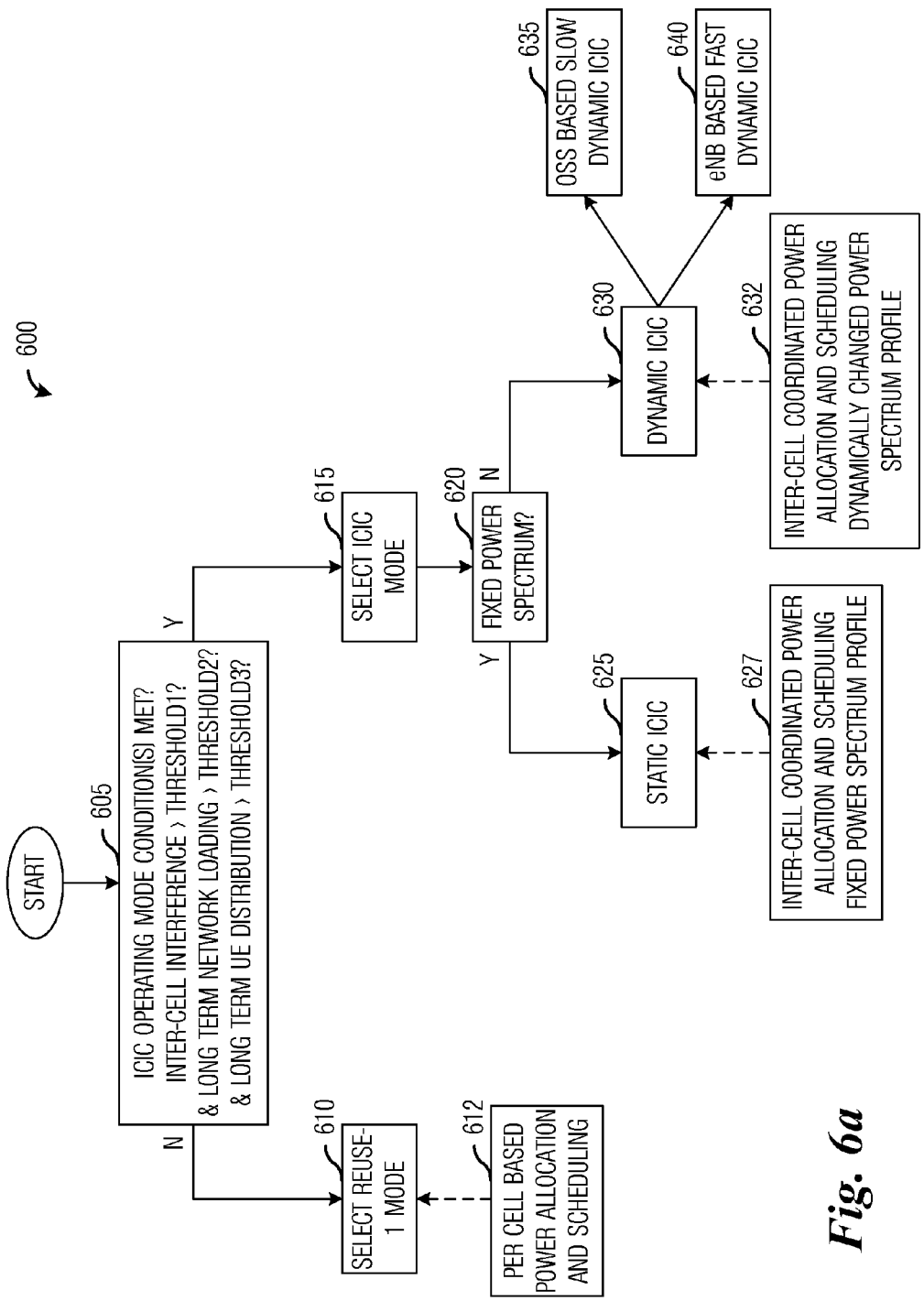
FIG. 6a illustrates an example flow diagram of ICIC controller operations in ICIC operation mode self-adaptation according to example embodiments described herein.

FIG. 6a illustrates a flow diagram of ICIC controller operations 600 in ICIC operation mode self-adaptation. ICIC controller operations 600 may be indicative of operations occurring in an ICIC controller, such as a global ICIC controller or a local ICIC controller, as the ICIC controller performs ICIC operation mode self-adaptation for a communications system or a portion of the communications system.

ICIC controller operations 600 may begin with the ICIC controller performing a check to determine if ICIC operating mode condition(s) are met (block 605). According to an example embodiment, the ICIC controller may determine if ICIC operating mode condition(s) are met by checking ICIC information with thresholds. As an example, the ICIC controller may check performance information, such as KPI, or operation information, such as inter-cell interference information, network loading information, and/or UE distribution information. As an example, the ICIC controller may perform checks to determine if an inter-cell interference level is greater than a first threshold, if long term network loading is greater than a second threshold, and if long term UE distribution is greater than a third threshold.

If the ICIC operating mode condition(s) are not met, then the ICIC controller may set the ICIC operating mode to be non-ICIC, for example, reuse-1 mode (block 610), which may make use of per eNB or cell based transmit power allocation and per eNB or cell based scheduling (block 612). As discussed previously, the setting of the ICIC operating mode may result in the setting of the ICIC parameters, which may be provided to eNBs, other ICIC controllers, or other network entities in the communications system.

If the ICIC operating mode condition(s) are met, then the ICIC controller may set the ICIC operating mode to ICIC (block 615). The ICIC controller may then perform another check to determine which type of ICIC mode to select (block 620). According to an example embodiment, the ICIC controller may check to determine if a fixed transmit power spectrum is being used.

If a fixed transmit power spectrum is being used, then the ICIC controller may select a static ICIC operating mode (block 625), which may make use of inter-cell coordinated transmit power allocation and scheduling with a fixed power spectrum profile (block 627). As discussed previously, the setting of the ICIC operating mode may result in the setting of the ICIC parameters, which may be provided to eNBs, other ICIC controllers, or other network entities in the communications system.

If a fixed transmit power spectrum is not being used, then the ICIC controller may select a dynamic ICIC operating mode (block 630), which make use of inter-cell coordinated transmit power allocation and scheduling with a dynamically changing power spectrum profile (block 632). As discussed previously, the setting of the ICIC operating mode may result in the setting of the ICIC parameters, which may be provided to eNBs, other ICIC controllers, or other network entities in the communications system.

According to an example embodiment, with a dynamic ICIC operating mode selected in block 630, the dynamic ICIC operating mode may be implemented as a global ICIC controller based slow dynamic ICIC operating mode (block 635), an individualized ICIC controller based fast dynamic ICIC operating mode (block 640), or a combination thereof. As their name imply, slow dynamic ICIC operating mode adapts slowly based on slow changing information, while fast dynamic ICIC operating mode adapts quickly based on fast changing information.

Figure 6B:
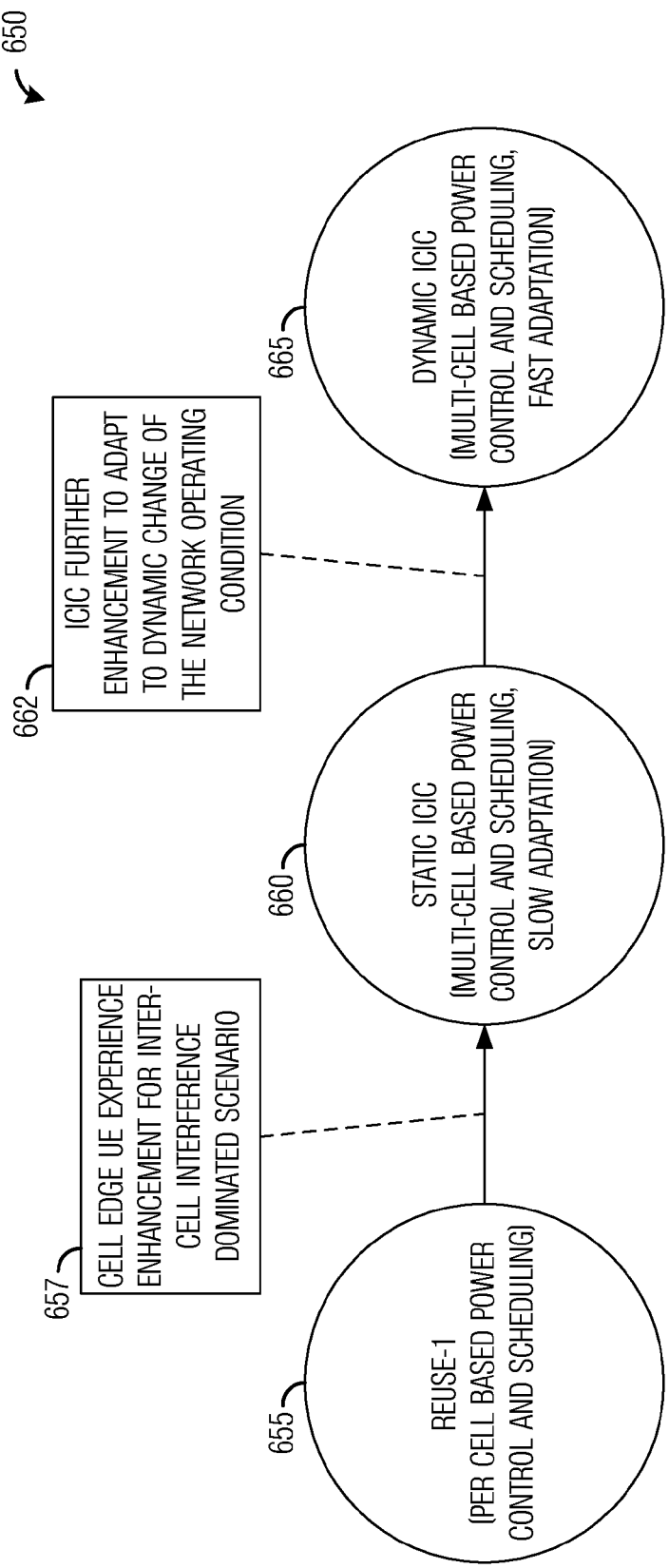
FIG. 6b illustrates an example transition diagram for ICIC operating mode self-adaptation according to example embodiments described herein.

FIG. 6b illustrates a transition diagram 650 for ICIC operating mode self-adaptation. Transition diagram 650 may be indicative of ICIC operating mode transitions occurring in a communications system (or a portion of a communications system) as ICIC operating mode of the communications system (or the portion of the communications system) is controlled by an ICIC controller.

The communications system (or the portion of the communications system) may begin operating in a non-ICIC operating mode, perhaps based on default or initial ICIC operation parameters (block 655). As an example, the communications system may be operating in a reuse-1 mode with per cell based power control and scheduling. Then, based on ICIC information, such as CEU experience information, and as a performance enhancement in an inter-cell interference dominated scenario (block 657), the ICIC controller may adapt the ICIC operating mode of the communications system (or the portion of the communications system) to an ICIC operating mode (block 660).

As an example, the ICIC controller may adapt the communications system (or the portion of the communications system) to a static ICIC operating mode, where multi-cell based power control and scheduling are used. With static ICIC, slow adaptation based on slowly changing information is used. The change to the static ICIC operating mode may result in a change in the ICIC parameters, which may be provided to eNBs, other ICIC controllers, as well as other network entities in the communications system.

Then, in order to provided further enhance ICIC to be able to adapt to dynamic changes in the operating condition of the communications system (or the portion of the communications system) (block 662), the ICIC controller may adapt the ICIC operating mode to a dynamic ICIC mode (block 665). The change to the dynamic ICIC operating mode may result in a change in the ICIC parameters, which may be provided to eNBs, other ICIC controllers, as well as other network entities in the communications system.

As an example, considering a scenario with a dynamic ICIC mode where multi-cell based power control and scheduling are used as in static ICIC. With dynamic ICIC, the ICIC controller may perform fast adaptation of the ICIC operating mode based on quickly changing information or slow adaptation of the ICIC operation mode base on slowly changing information. In general, due to the nature of the quickly changing information, fast adaptation is performed at an individualized ICIC controller level for a single eNB, while slow adaptation is performed at global ICIC controllers or local ICIC controllers.

Although shown in FIG. 6b as uni-directional transitions from non-ICIC operation to static ICIC operation and then to dynamic ICIC operation, the ICIC operating mode self-adaptation may generally transition in either direction and may even skip transitions. As an example, the ICIC controller may adapt the operating mode from non-ICIC to static ICIC and then back to non-ICIC based on the condition of the communications system. Alternatively, it may be possible for the ICIC controller to adapt the operating mode from non-ICIC to dynamic ICIC and then back to static ICIC, again, based on the condition of the communications system. Therefore, the discussion of uni-directional transitions and the single step transitions should not be construed as being limiting to either the scope or the spirit of the example embodiments.

Figure 7A:
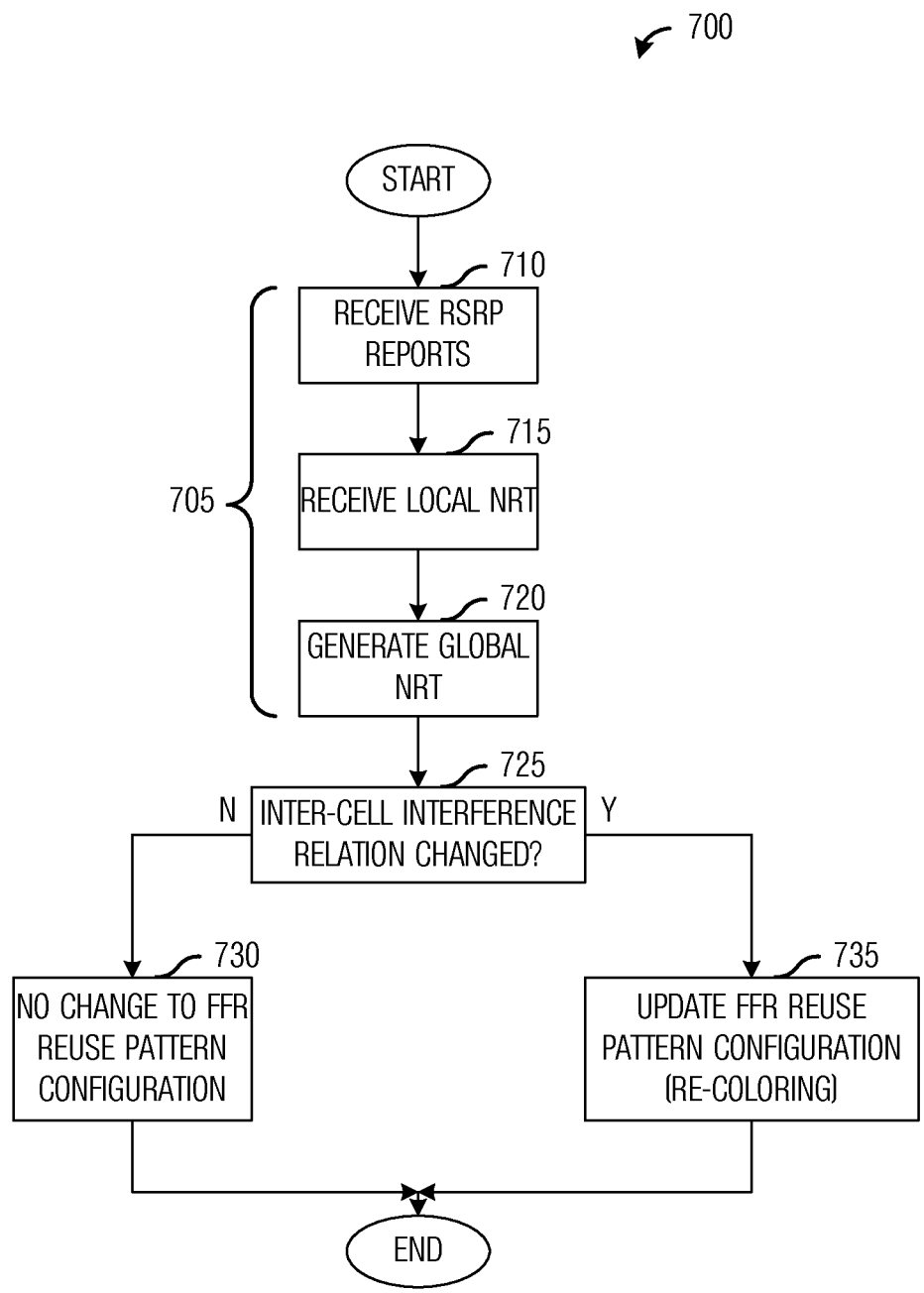
FIG. 7a illustrates an example flow diagram of ICIC controller operations in ICIC configuration self-adaptation according to example embodiments described herein.

FIG. 7a illustrates a flow diagram of ICIC controller operations 700 in ICIC configuration self-adaptation. ICIC controller operations 700 may be indicative of operations occurring in an ICIC controller, such as a global ICIC controller or a local ICIC controller, as the ICIC controller performs ICIC configuration self-adaptation for a communications system or a portion of the communications system.

ICIC controller operations 700 may begin with the ICIC controller generating inter-cell interference relation information (block 705). The inter-cell interference relation information may be generated by the ICIC controller based on signal and/or interference measurements, aggregated measurements, processed measurements, and so forth, from UEs served by eNBs, eNBs, and so on. According to an example embodiment, an eNB may receive signal and/or interference measurements (e.g., in the form of reference signal received power (RSRP) reports) from UEs served by the eNB (block 710). From the RSRP reports, the eNB may generate a localized neighbor relation table (NRT) that includes information about interference caused to the UEs of the eNB from transmissions from neighboring UEs and/or neighboring eNBs. The eNB may transmit the localized NRT to its localized ICIC controller or global ICIC controller (block 715). The localized ICIC controller or the global ICIC controller may generate global NRT from the localized NRT received from eNBs, individualized ICIC controllers, and/or localized ICIC controllers (block 720).

The ICIC controller may perform a check to determine if an inter-cell interference relation (an example of operation information) has changed (block 725). According to an example embodiment, the ICIC controller may check the global NRT against a threshold(s) to determine if the inter-cell interference relation has changed. As an example, the ICIC controller may check for changes in long term mutual inter-cell interference relationship information. If the inter-cell interference relation has not changed or has not changed sufficiently, then the ICIC controller may make no change to the ICIC configuration, i.e., changes to a FFR reuse pattern(s) (block 730).

However, if the inter-cell interference relation has changed or has changed sufficiently, then the ICIC controller may make change(s) to the ICIC configuration, i.e., changes to the FFR reuse pattern(s) (block 735). As an example, the ICIC controller may change a primary FFR reuse pattern, a secondary FFR reuse pattern, or both, based on changes in the inter-cell interference relation. The changes to the FFR reuse pattern(s) may result in changes to the ICIC parameters, which may be transmitted to the eNBs, other ICIC controllers, as well as other network entities in the communications system.

FIG. 7b illustrates a diagram 700 of a hierarchical FFR pattern configuration and use thereof. Diagram 700 displays a first plurality of basic FFR reuse patterns, such as first FFR reuse pattern 705, second FFR reuse pattern 707, and third FFR reuse pattern 709. From the first plurality of basic FFR reuse patterns, a second plurality of basic FFR reuse patterns 710 may be generated. According to an example embodiment, the basic FFR reuse patterns in the second plurality of basic FFR reuse patterns may be derived from the first plurality of basic FFR reuse patterns. As an example, FFR reuse patterns 712 and 713 may be derived from first FFR reuse pattern 705.

Although diagram 700 illustrates three FFR reuse patterns in the first plurality of basic FFR reuse patterns and six FFR reuse patterns in the second plurality of basic FFR reuse patterns, there is generally no restriction on the number of FFR reuse patterns in the first plurality of basic FFR reuse patterns and the second plurality of basic FFR reuse patterns. Therefore, the illustration and discussion of three and six FFR reuse patterns should not be construed as being limiting to either the scope or the spirit of the example embodiments.

The FFR reuse patterns in the second plurality of basic FFR reuse patterns may be allocated to the eNBs or cells in the communications system. According to an example embodiment, in a hierarchical FFR reuse pattern configuration, multiple FFR reuse patterns may be assigned to each eNB or cell. As an example, consider a two-step hierarchical FFR reuse pattern configuration as shown in diagram 700, either one or two FFR reuse patterns may be assigned to each eNB or cell. Generally, each eNB or cell in the communications system may be assigned a primary FFR reuse pattern and then a subset of the eNBs or cells in the communications system may be assigned a secondary FFR reuse pattern.

According to an example embodiment, assignment of primary FFR reuse patterns (and potentially secondary FFR reuse patterns) to eNBs or cells may be based on operation information such as UE number, UE distribution, inter-cell interference relation, and so on. As shown in FIG. 7b, cells 720 and 722 may be assigned both a primary FFR reuse pattern and a secondary FFR reuse pattern, while cells 725 and 727 may be assigned only a primary FFR reuse pattern.

Figure 8:
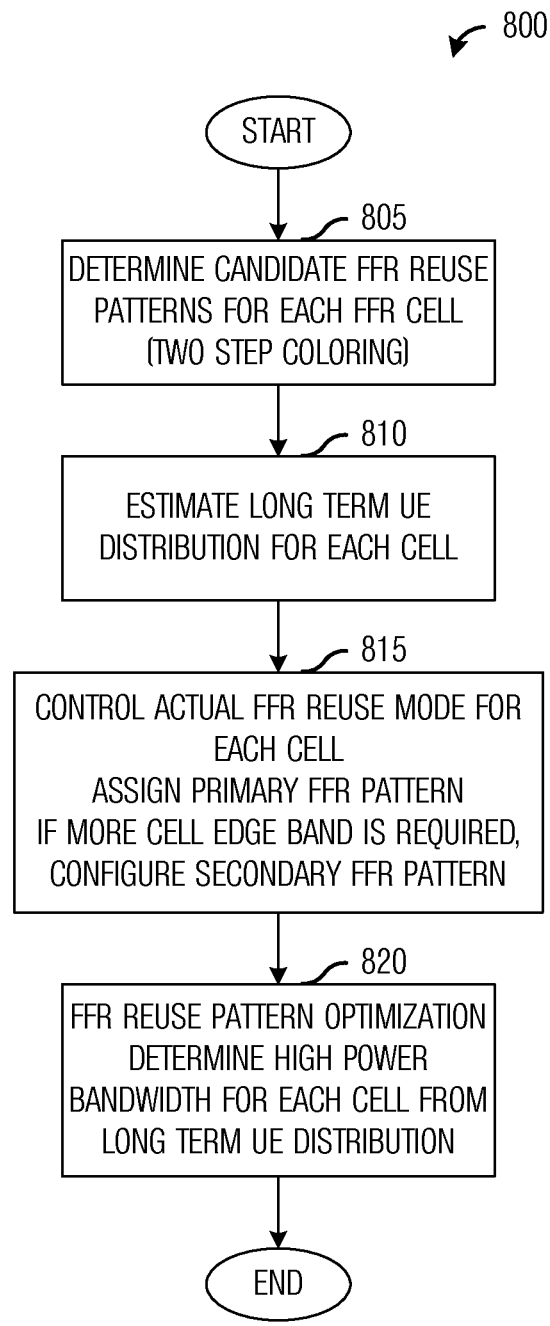
FIG. 8 illustrates an example flow diagram of ICIC controller operations in ICIC performance self-optimization with slow dynamic ICIC according to example embodiments described herein.

FIG. 8 illustrates a flow diagram of ICIC controller operations 800 in ICIC performance self-optimization with slow dynamic ICIC. ICIC controller operations 800 may be indicative of operations occurring in an ICIC controller, such as a global ICIC controller or a local ICIC controller, as the ICIC controller performs ICIC performance self-optimization for a communications system or a portion of the communications system.

ICIC controller operations 800 may begin with the ICIC controller determining candidate FFR reuse patterns for each eNB or cell configured for ICIC operation (block 805). According to an example embodiment, the ICIC controller may utilize a coloring algorithm, such as a two-step coloring algorithm, to determine the candidate FFR reuse patterns for the eNBs or cells.

The ICIC controller may estimate long term UE distribution for each eNB or cell (block 810). The ICIC controller may estimate the long term UE distribution based on operation information, such as historical information for the eNB or cell, historical information for the UEs, current scheduling information, mobility information, and so on.

The ICIC controller may specify a FFR reuse mode for each cell, assigning a primary FFR reuse pattern and if there is a need to support additional CEUs, a secondary FFR reuse pattern may be assigned (block 815). According to an example embodiment, the primary FFR reuse pattern and the secondary FFR reuse pattern may define candidate high power bands for ICIC operation and ICIC performance self-optimization. As an example, with the primary FFR reuse pattern assigned for each eNB and/or cell, a presence or lack of CEU may result in an additional assignment of a secondary FFR reuse pattern for an eNB and/or cell.

The ICIC controller may also perform FFR reuse pattern optimization by determining a high power bandwidth for each eNB or cell from operation information, including long term information, such as long term UE distribution (block 820). FFR reuse pattern optimization may be realized by secondary coloring. According to an example embodiment, based on the long term information, the eNBs or cells in the communications system may have different reuse factors to help adapt to the operating conditions. Changes to FFR reuse pattern assignments may result in changes to the ICIC parameters, which may be transmitted to eNBs, other ICIC controllers, as well as other network entities in the communications system.

As discussed previously, dynamic ICIC operation may be in one of two forms, slow dynamic ICIC operation and fast dynamic ICIC operation. Differences between slow dynamic ICIC operation and fast dynamic ICIC operation may be mainly in rate of update, slow and/or fast change information, and so on. Slow dynamic ICIC operation may be a baseline ICIC operating mode.

Figure 9A:
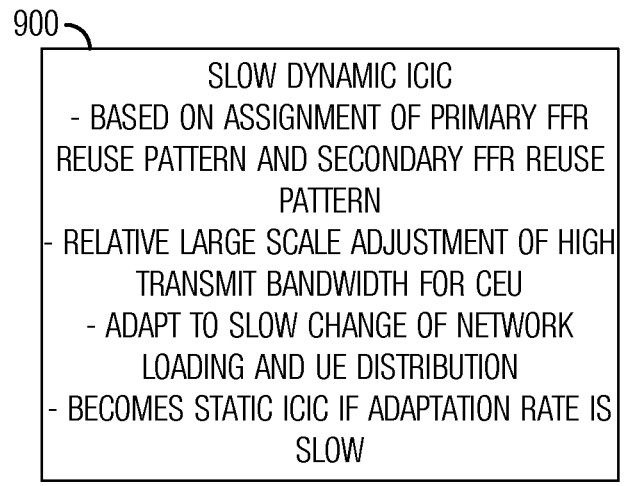
FIG. 9a illustrates an example diagram of slow dynamic ICIC operation characteristics according to example embodiments described herein.

FIG. 9a illustrates a diagram 900 of slow dynamic ICIC operation characteristics. Slow dynamic ICIC operation may be based on the assignment of the primary FFR reuse pattern and the secondary FFR reuse pattern, which may result in large scale adjustment of high transmission bandwidth for CEU. Generally, slow dynamic ICIC operation adapts based on slowly changing operation information, such as network loading and UE distribution information. Slow dynamic ICIC operation may become static ICIC operation if the adaptation rate is sufficiently slow.

Figure 9B:
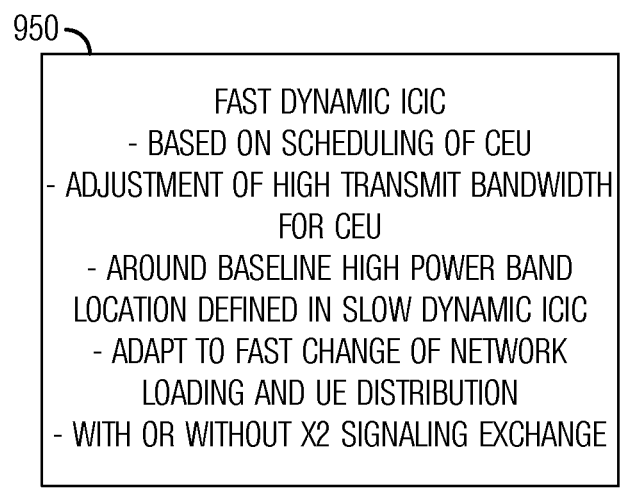
FIG. 9b illustrates an example diagram of fast dynamic ICIC operation characteristics according to example embodiments described herein.

FIG. 9b illustrates a diagram 950 of fast dynamic ICIC operation characteristics. Fast dynamic ICIC may be based on the scheduling of CEU and may provide further adjustment of high transmit bandwidth for the CEU. Adjustment of the high transmit bandwidth may be around baseline high power band locations defined in slow dynamic ICIC operation. Generally, fast dynamic ICIC operation adapts based on operation information, such as fast changing network loading and UE distribution information. Fast dynamic ICIC operation may be performed with or without high-speed signaling exchanges, such as X2 signaling exchanges.

Figure 10:
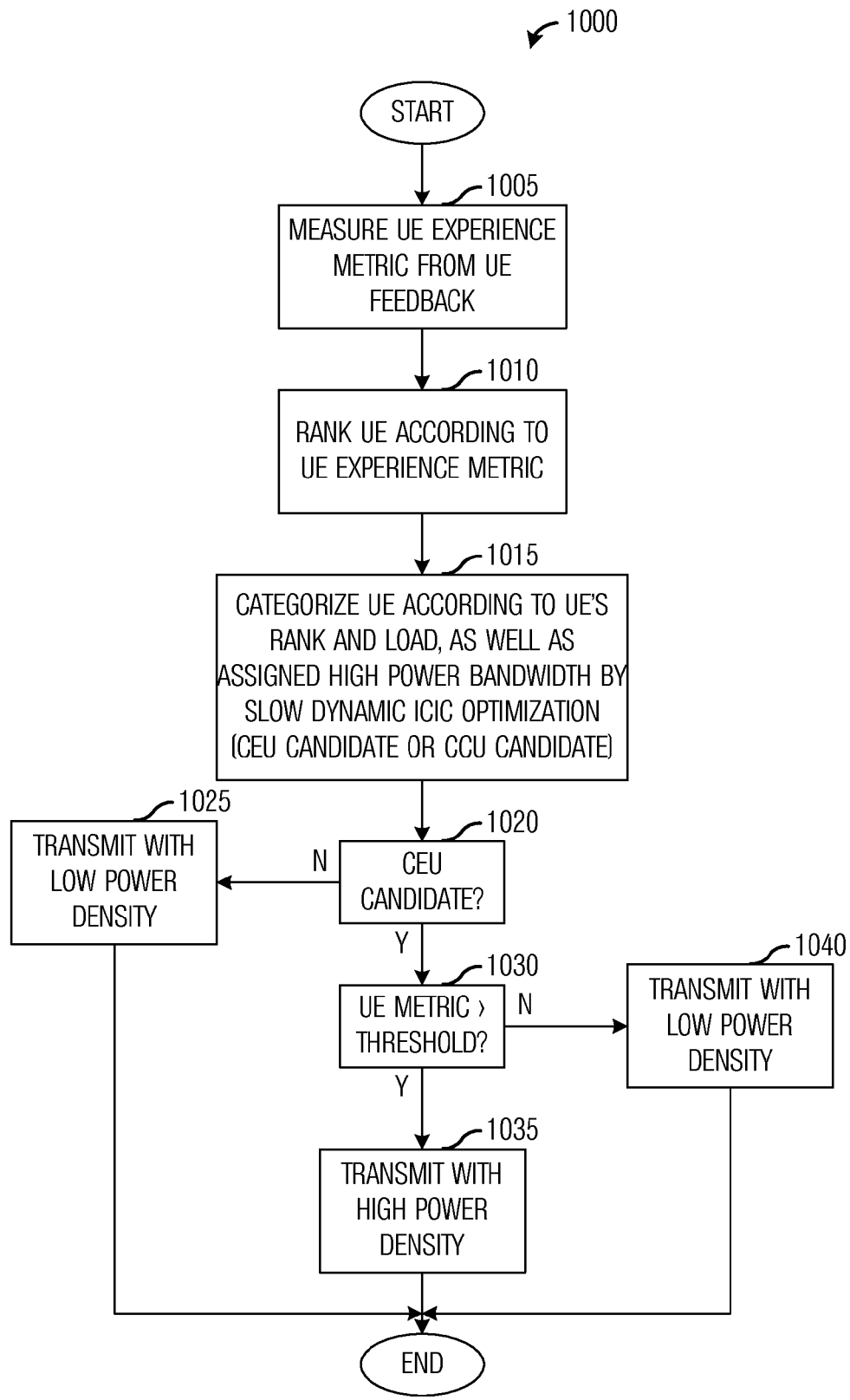
FIG. 10 illustrates an example flow diagram of ICIC controller operations in ICIC performance self-optimization with fast dynamic ICIC according to example embodiments described herein.

FIG. 10 illustrates a flow diagram of ICIC controller operations 1000 in ICIC performance self-optimization with fast dynamic ICIC. ICIC controller operations 1000 may be indicative of operations occurring in an ICIC controller, such as a localized ICIC controller or an individualized ICIC controller, as the ICIC controller performs ICIC performance self-optimization with fast dynamic ICIC for a portion of a communications system or an eNB or cell.

ICIC controller operations 1000 may begin with the ICIC controller determining a UE's experience metric, e.g., the UE's geometry, based on feedback information provided to the ICIC controller by the UE (block 1005). The ICIC controller may rank the UE with other UEs based on the UE's experience metric (block 1010). The ICIC controller may categorize the UE as either a CEU candidate or a CCU candidate based on the UE's ranking with other UEs, the UE's load, as well as the UE's assigned high power bandwidth (assigned by slow dynamic ICIC optimization, for example) (block 1015).

The ICIC controller may then perform a check to determine the categorization of the UE, i.e., is the UE a CEU candidate or a CCU candidate (block 1020). If the UE is not a CEU candidate, then the ICIC controller may set the transmit power level of the UE as transmit with low power density since the UE is not too far (in the electrical distance sense) from the eNB and high transmit power level may not be required (block 1025). According to an example embodiment, changes to the categorization of the UEs may be based on fast changing information and may differ from categorization of the UEs based on slow changing information. As an example, a UE may be categorized as a CEU candidate based on slow changing information may subsequently be categorized as not a CEU since it is relatively close to eNB (in the electrical distance sense) and a low transmit power level may be sufficient. Changes to the transmit power density may result in changes to the ICIC parameters, which may be transmitted to the eNBs, other ICIC controllers, as well as other network entities in the communications system.

If the UE is a CEU candidate, then the ICIC controller may perform a check to determine if the UE experience metric meets a threshold (block 1030). As an example, the threshold may be based on the UE's long term geometry. If the UE experience metric meets the threshold, for example, the long term geometry is lower than a specified value in dB, then the ICIC controller may set the transmit power level of the UE as transmit with high power density since the UE is far from the eNB and high transmit power level may be required to improve performance for the UE (block 1035). If the UE experience metric does not meet the threshold, then the ICIC controller may set the transmit power level of the UE as transmit with low power density low transmit power level may be all that is required to attain adequate performance for the UE (block 1040). Changes to the transmit power density may result in changes to the ICIC parameters, which may be transmitted to the eNBs, other ICIC controllers, as well as other network entities in the communications system.

Figure 11A:
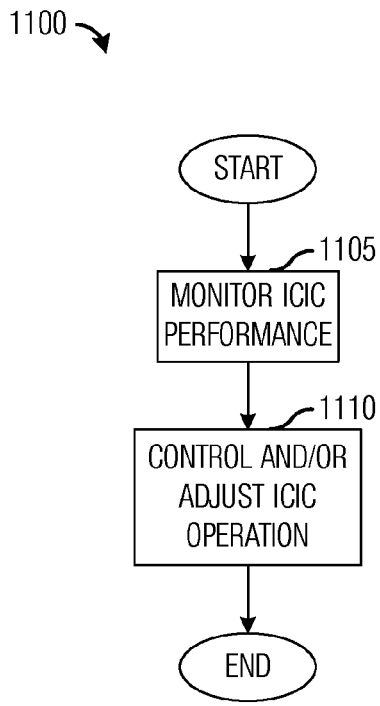
FIG. 11a illustrates an example flow diagram of ICIC controller operations in ICIC performance self-maintenance according to example embodiments described herein.

FIG. 11a illustrates a flow diagram of ICIC controller operations 1100 in ICIC performance self-maintenance. ICIC controller operations 1100 may be indicative of operations occurring in an ICIC controller, such as a global ICIC controller or a local ICIC controller, as the ICIC controller performs ICIC performance self-maintenance for a communications system or a portion of the communications system.

ICIC controller operations 1100 may begin with the ICIC controller monitoring the ICIC performance (block 1105). According to an example embodiment, the ICIC controller, operating in a centralized manner, monitors the ICIC performance through the monitoring of performance information, such as KPI. As an example, the KPI monitored by the ICIC controller may include eNB throughput, eNB edge throughput, connection drop rate, handoff success and/or failure rate, and so on.

Based on the monitored KPI, the ICIC controller may control and/or adjust ICIC operation (block 1110). According to the example embodiment, the controlling and/or adjusting of the ICIC operation are performed automatically without end-user input. Depending on the monitored KPI, the ICIC controller may control and/or adjust ICIC operation to improve overall communications system performance. Changes to the ICIC operation may result in changes to the ICIC parameters, which may be transmitted to the eNBs, other ICIC controllers, as well as other network entities in the communications system.

Figure 11B:
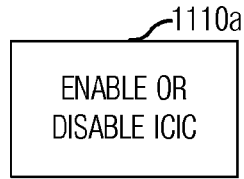
FIGS. 11b through 11e illustrate example flow diagrams for controlling and/or adjusting ICIC operation according to example embodiments described herein.

FIG. 11b illustrates a first flow diagram 1110a for controlling and/or adjusting ICIC operation. According to an example embodiment, the ICIC controller may control and/or adjust ICIC operation by enabling or disabling ICIC operation. As discussed previously, the ICIC controller may switch the operation of the communications system or a portion of the communications system from non-ICIC operation to ICIC operation. A fall back operation mode may be non-ICIC operation (e.g., reuse-1).

Figure 11C:
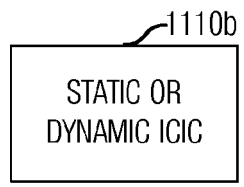

FIG. 11c illustrates a second flow diagram 1110b for controlling and/or adjusting ICIC operation. According to an example embodiment, the ICIC controller may control and/or adjust ICIC by adjusting the ICIC mode. The ICIC controller may switch the ICIC mode from static ICIC to dynamic ICIC and vice versa. A fall back operation mode may be static ICIC mode.

Figure 11D:
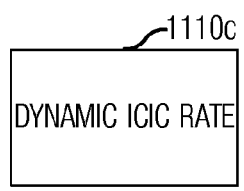

FIG. 11d illustrates a third flow diagram 1110c for controlling and/or adjusting ICIC operation. According to an example embodiment, the ICIC controller may control and/or adjust ICIC by adjusting a dynamic ICIC rate. The ICIC controller may switch the ICIC rate from slow dynamic ICIC to fast dynamic ICIC rate and vice versa. A fall back operation mode may be slow dynamic ICIC mode. It is noted that there may be more than two dynamic ICIC rates.

Figure 11E:
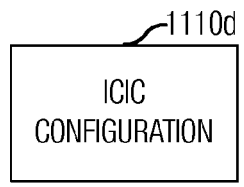

FIG. 11e illustrates a fourth flow diagram 1110d for controlling and/or adjusting ICIC operation. According to an example embodiment, the ICIC controller may control and/or adjust ICIC by adjusting the ICIC configuration. The ICIC controller may switch the ICIC configuration (e.g., the FFR reuse patterns, transmit power levels, and so on) by triggering an ICIC configuration update.

Figure 12:
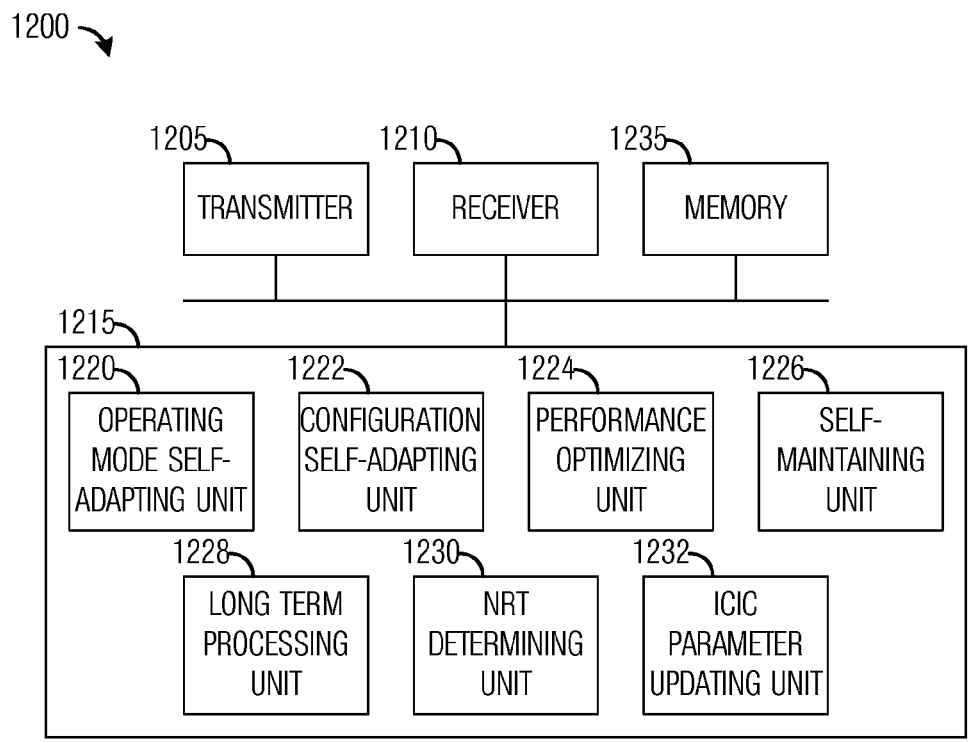
FIG. 12 illustrates an example communications controller according to example embodiments described herein.

FIG. 12 illustrates a diagram of a communications controller 1200. Communications controller 1200 may be an implementation of an ICIC controller, such as a global ICIC controller or a localized ICIC controller, of a communications system. Communications controller 1200 may be used to implement various ones of the embodiments discussed herein. As shown in FIG. 12, a transmitter 1205 is configured to send control channels, messages, information, and so forth, and a receiver 1210 is configured to receive messages, information, and so on. Transmitter 1205 and receiver 1210 may have a wireless interface, a wireline interface, or a combination thereof.

An operating mode self-adapting unit 1220 is configured to perform ICIC operating mode self-adaptation, such as switching between non-ICIC mode to ICIC mode based on operating mode conditions. Operating mode self-adapting unit 1220 may make use of ICIC information, such as operation information and performance information (including KPI change), to make changes in the operating mode. A configuration self-adapting unit 1222 is configured to perform ICIC configuration self-configuration, such as FFR reuse pattern selection, as well as transmit power level selection. Configuration self-adapting unit 1222 may make use of ICIC information, such as operation information, including network topology changes, as well as long term information, e.g., inter-cell interference and UE distribution changes, to change the configuration. A performance optimizing unit 1224 is configured to perform ICIC performance optimization at a slow rate or a fast rate depending on the nature of the ICIC information used to perform performance optimization. Slow rate optimization may generally be performed for an entirety of a communications system or a portion of the communications system, while fast rate optimization may typically be performed on an individual basis.

A self-maintaining unit 1226 is configured to monitor performance of the communications system and to trigger changes in the communications system to improve performance. Self maintaining unit 1226 may enable or disable ICIC operation, select between static or dynamic ICIC operation, specify a dynamic ICIC rate, trigger ICIC configuration, and so on, based on the ICIC information of the communications system. A long term processing unit 1228 is configured to process long term information, such as inter-cell interference, UE distribution, UE geometry, and so on. A NRT determining unit 1230 is configured to determine NRT, such as global NRT or local NRT, from NRT provided by individualized ICIC controllers, as well as measurements from UEs. An ICIC parameter updating unit 1232 is configured to update ICIC parameters based on the changes to the operating mode of the communications system. A memory 1235 is configured to store the operating mode information, configuration information, ICIC information (including operation information and performance information), FFR reuse pattern information, long term information, NRT, ICIC parameters, and so forth.

The elements of communications controller 1200 may be implemented as specific hardware logic blocks. In an alternative, the elements of communications controller 1200 may be implemented as software executing in a processor, controller, application specific integrated circuit, or so on. In yet another alternative, the elements of communications controller 1200 may be implemented as a combination of software and/or hardware.

As an example, transmitter 1205 and receiver 1210 may be implemented as a specific hardware block, while operating mode self-adapting unit 1220, configuration self-adapting unit 1222, performance optimizing unit 1224, self-maintaining unit 1226, long term processing unit 1228, NRT determining unit 1230, and ICIC parameter updating unit 1232 may be software modules executing in a processor 1215, such as a microprocessor, a digital signal processor, a custom circuit, or a custom compiled logic array of a field programmable logic array.

Figure 13:
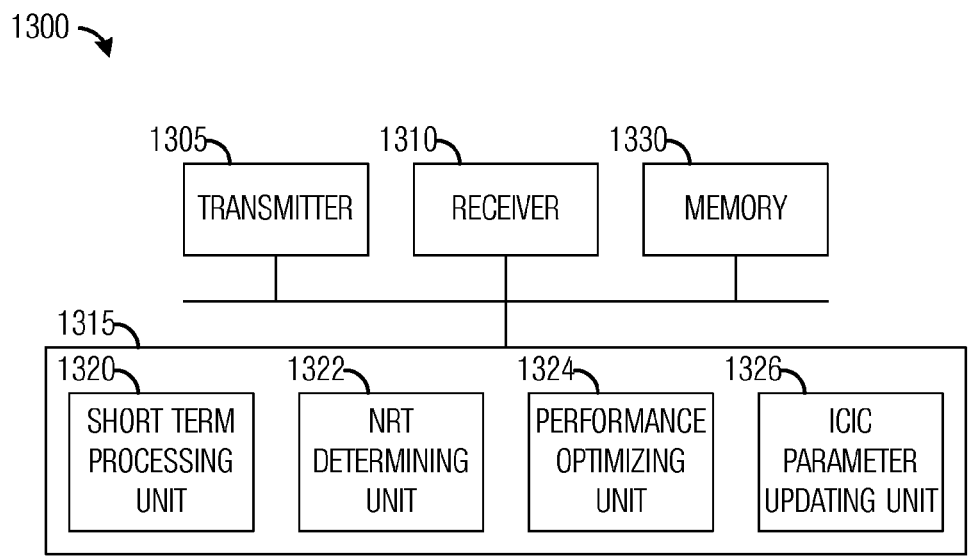
FIG. 13 illustrates an example communications controller according to example embodiments described herein.

FIG. 13 illustrates a diagram of a communications controller 1300. Communications controller 1300 may be an implementation of an ICIC controller, such as an individualized ICIC controller, of a communications system. Communications controller 1300 may be used to implement various ones of the embodiments discussed herein. As shown in FIG. 13, a transmitter 1305 is configured to send control channels, messages, information, and so forth, and a receiver 1310 is configured to receive messages, information, and so on. Transmitter 1305 and receiver 1310 may have a wireless interface, a wireline interface, or a combination thereof.

A short term processing unit 1320 is configured to process ICIC information, such as short term information, including inter-cell interference, UE distribution, UE geometry, and so on. A NRT determining unit 1322 is configured to determine NRT, such as a local NRT, from measurements from UEs. A performance optimizing unit 1324 is configured to perform ICIC performance optimization at a fast rate depending on the nature of the ICIC information used to perform performance optimization. Fast rate optimization may typically be performed on an individual basis. An ICIC parameter updating unit 1326 is configured to update ICIC parameters based on the changes to the operating mode of the communications system. A memory 1330 is configured to store the operating mode information, configuration information, ICIC information (including operating information and performance information), FFR reuse pattern information, long term information, NRT, ICIC parameters, and so forth.

The elements of communications controller 1300 may be implemented as specific hardware logic blocks. In an alternative, the elements of communications controller 1300 may be implemented as software executing in a processor, controller, application specific integrated circuit, or so on. In yet another alternative, the elements of communications controller 1300 may be implemented as a combination of software and/or hardware.

As an example, transmitter 1305 and receiver 1310 may be implemented as a specific hardware block, while short term processing unit 1320, NRT determining unit 1322, performance optimizing unit 1324, and ICIC parameter updating unit 1326 may be software modules executing in a processor 1315, such as a microprocessor, a digital signal processor, a custom circuit, or a custom compiled logic array of a field programmable logic array.

Although the present invention and its advantages have been described in detail, it should be understood that various changes, substitutions and alterations can be made herein without departing from the spirit and scope of the invention as defined by the appended claims.

What is claimed is:

1. A method for operating a controller of a communications system, the method comprising:
    determining, by the controller, long-term and/or slow-changing inter-cell interference coordination (ICIC) information for the communications system;
    automatically adjusting, by the controller without end-user input, long-term and/or slow-changing power domain ICIC parameters according to the ICIC information to increase an overall performance level of the communications system, wherein automatically adjusting the ICIC parameters comprises automatically adjusting ICIC performance parameters with a slow adaptation rate according to the ICIC information, including:
        estimating a long term user equipment distribution for each communications controller in a third subset of communications controllers in the communications system;
        assigning a primary fractional frequency reuse pattern for each communications controller in the third subset of communications controllers; and
        assigning a second fractional frequency reuse pattern for each communications controller in a fourth subset of communications controllers having a number of user equipment operating on an outer edge of a coverage area of the respective communications controller exceeding a load threshold; and
    transmitting, by the controller, the power domain ICIC parameters to network entities in the communications system.

2. The method of claim 1, wherein the automatically adjusting is performed by the controller in a centralized manner.

3. The method of claim 1, wherein transmitting the power domain ICIC parameters to the network entities comprises transmitting to a communications controller controlled by the controller, another controller in the communications system, or a combination thereof.

4. The method of claim 1, wherein the ICIC information comprises performance information and operation information.

5. The method of claim 4, wherein the operation information comprises long term communications system load change information, long term user equipment distribution change information, communications system topology information, inter-cell interference relation change information, slow communications system load change information, slow user equipment distribution change information, or a combination thereof.

6. The method of claim 4, wherein the performance information comprises communications controller coverage area throughput, communications controller coverage area edge throughput, connection drop rate, handoff success rate, handoff failure rate, or a combination thereof.

7. The method of claim 1, wherein automatically adjusting the power domain ICIC parameters comprises automatically adjusting operating mode parameters according to the ICIC information.

8. The method of claim 7, wherein automatically adjusting the operating mode parameters comprises selecting a non-ICIC mode, a static ICIC mode, or a dynamic ICIC mode.

9. The method of claim 1, wherein automatically adjusting the power domain ICIC parameters comprises automatically adjusting configuration parameters according to the ICIC information.

10. The method of claim 9, wherein automatically adjusting the configuration parameters comprises updating a first primary fractional frequency reuse pattern for each communications controller in a first subset of communications controllers in the communications system.

11. The method of claim 9, wherein automatically adjusting the configuration parameters further comprises updating a secondary fractional frequency reuse pattern for each communications controller in a second subset of communications controllers in the communications system.

12. The method of claim 1, wherein automatically adjusting the ICIC performance parameters further comprises determining a high transmit power bandwidth for each communications controller in a fifth subset of communications controllers in the communications system.

13. A method for operating a controller, the method comprising:
    determining, by the controller, inter-cell interference coordination (ICIC) information for a communications system;
    automatically adjusting, by the controller without end-user input, ICIC parameters with a fast adaptation rate according to the ICIC information to increase an overall performance of the communications system, wherein the ICIC parameters comprise a transmit power density; and
    transmitting, by the controller, the ICIC parameters to a communications controller controlled by the controller, another controller in the communications system, or a combination thereof in the communications system.

14. The method of claim 13, wherein automatically adjusting the ICIC parameters comprises:
    categorizing a candidate user equipment according to its experience metric; and
    setting the transmit power density for the candidate user equipment according to a category of the candidate user equipment.

15. The method of claim 14, further comprising setting the transmit power density according to a ranking of a geometry of the candidate user equipment.

16. The method of claim 14, wherein the category comprises either a communications controller edge candidate user equipment or a communications controller center candidate user equipment.

17. The method of claim 13, further comprising automatically adjusting the ICIC parameters with the fast adaptation rate according to a high power bandwidth assigned in adjusting performance parameters with a slow adaptation rate.

18. A controller comprising:
a processor configured to determine long-term and/or slow-changing inter-cell interference coordination (ICIC) information for a communications system and to automatically adjust long-term and/or slow-changing power domain ICIC parameters, without end-user input, according to the ICIC information to increase an overall performance level of the communications system, wherein the processor configured to automatically adjust the ICIC parameters comprises the processor configured to automatically adjust ICIC performance parameters with a slow adaptation rate according to the ICIC information, including:
estimate a long term user equipment distribution for each communications controller in a third subset of communications controllers in the communications system;
assign a primary fractional frequency reuse pattern for each communications controller in the third subset of communications controllers; and
assign a second fractional frequency reuse pattern for each communications controller in a fourth subset of communications controllers having a number of user equipment operating on an outer edge of a coverage area of the respective communications controller exceeding a load threshold; and
a transmitter coupled to the processor, the transmitter configured to transmit the power domain ICIC parameters to network entities in the communications system.

19. The controller of claim 18, wherein the processor is configured to automatically adjust the power domain ICIC parameters in a centralized manner.

20. The controller of claim 18, wherein the processor is configured to automatically adjust operating mode parameters according to the ICIC information, to automatically adjust configuration parameters according to the ICIC information, or a combination thereof.

21. The controller of claim 18, wherein the controller is a global ICIC controller for the communications system.

22. The controller of claim 18, wherein the controller is a local ICIC controller for a portion of the communications system.

23. The controller of claim 18, wherein the controller is configured to automatically adjust the power domain ICIC parameters in a centralized manner.

24. A controller comprising:
a processor configured to determine inter-cell interference coordination (ICIC) information for a communications system, and to automatically adjust ICIC parameters, without end-user input, with a fast adaptation rate according to the ICIC information to increase an overall performance of the communications system, wherein the ICIC parameters comprise a transmit power density; and
a transmitter coupled to the processor, the transmitter configured to transmit the ICIC parameters to a communications controller controlled by the controller, another controller in the communications system, or a combination thereof in the communications system.

25. The controller of claim 24, wherein the processor is configured to categorize a candidate user equipment according to its experience metric, and to set the transmit power density for the candidate user equipment according to a category of the candidate user equipment.

26. The controller of claim 24, wherein the processor is configured to set the transmit power density according to a ranking of a geometry of a candidate user equipment.

27. The controller of claim 24, wherein the processor is further configured to adjust the ICIC parameters with the fast adaptation rate according to a high power bandwidth assigned in adjusting performance parameters with a slow adaptation rate.

28. The controller of claim 24, wherein the controller is an individualized inter-cell interference coordination controller in the communications system.

* * * * *